United States Patent [19]

Carré

[11] 4,059,174
[45] Nov. 22, 1977

[54] BRAKING CORRECTION DEVICE

[75] Inventor: Jean-Jacques Carré, Montreuil, France

[73] Assignee: Societe Anonyme D.B.A., Paris, France

[21] Appl. No.: 766,322

[22] Filed: Feb. 7, 1977

[30] Foreign Application Priority Data

Feb. 18, 1976 France .............................. 76.04422

[51] Int. Cl.$^2$ .............................................. B60T 8/18
[52] U.S. Cl. .............................. 188/195; 137/625.69; 251/127; 251/DIG. 1; 303/22 R
[58] Field of Search ...................... 188/195; 303/22 R; 251/DIG. 1, 127; 137/625.67, 625.69

[56] References Cited

U.S. PATENT DOCUMENTS

| 1,395,469 | 11/1921 | Benbow | 137/625.69 |
|---|---|---|---|
| 2,517,061 | 8/1950 | Stackelberg | 251/DIG. 1 |
| 3,191,999 | 6/1965 | Cordiano | 303/22 R |
| 3,802,750 | 4/1974 | Kawai | 303/22 R |
| 3,826,281 | 7/1974 | Clark | 251/127 X |

*Primary Examiner*—George E. A. Halvosa
*Attorney, Agent, or Firm*—Paul David Schoenle; Ken C. Decker

[57] ABSTRACT

The braking correcting device of the hydraulic type comprises a housing in which is defined a cavity. A stepped piston is disposed movable in the cavity and has one end which projects outwards from the housing, the piston having a head slidable in a bore formed in the cavity of the housing for separating the cavity into an inlet chamber which adjoins the piston end face having the smaller effective cross sectional area, and an outlet chamber which adjoins the piston end face having the larger effective cross sectional area. The piston head contains a peripheral groove which receives with axial and radial clearance a ring of elastomeric material capable of disconnecting the two chambers when the piston moves a predetermined distance from its idle position which is fixed relative to the housing, overcoming a return force. The bore comprises a first portion having a fluid tight side wall adjoining the inlet chamber, and a second portion contiguous to the first portion and adjoining the outlet chamber. The second portion has a side wall which is permeable to hydraulic brake fluid.

2 Claims, 1 Drawing Figure

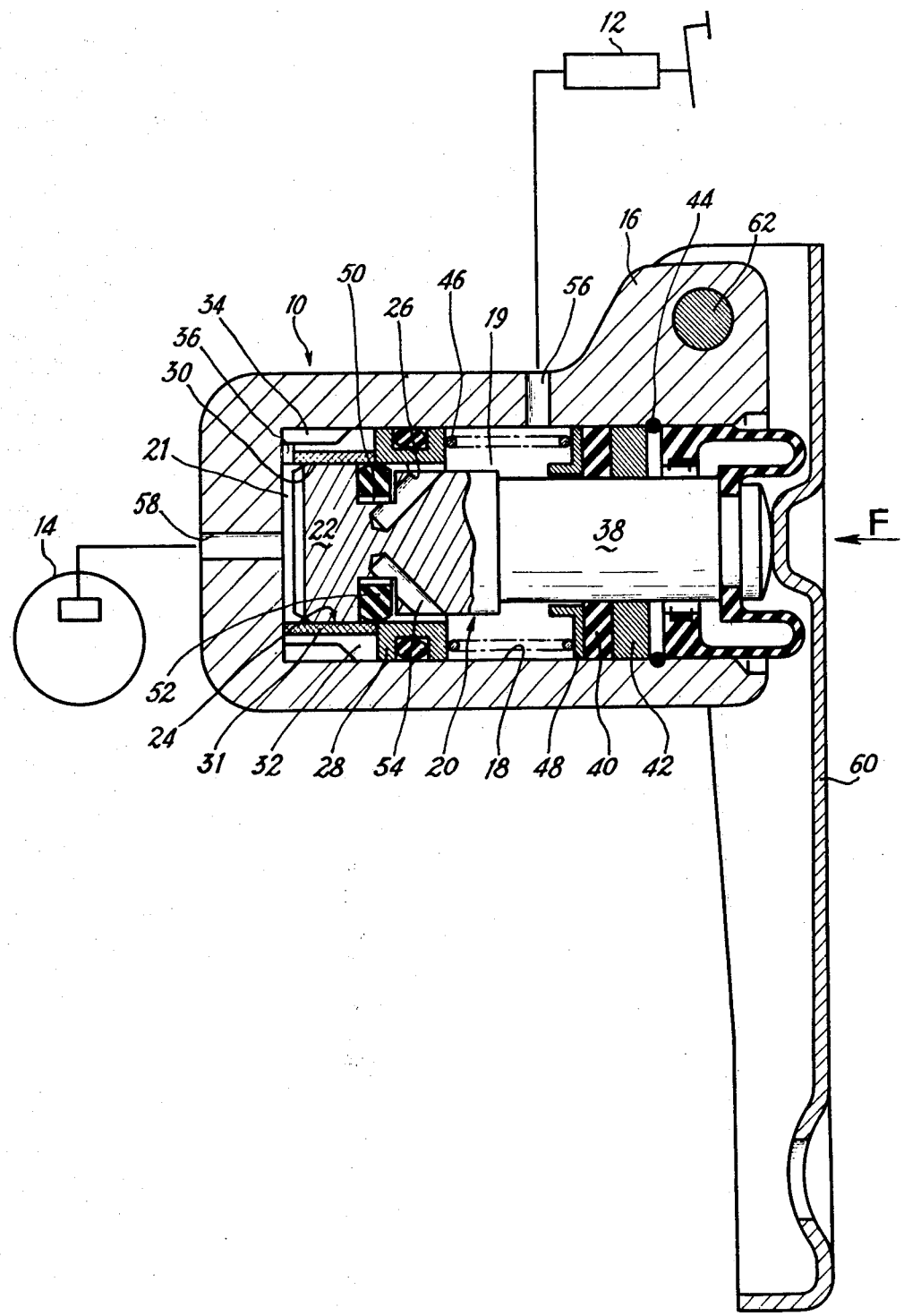

BRAKING CORRECTION DEVICE

The invention relates primarily to a braking correction device of the hydraulic type for use between a brake pressure source and brake actuators in a motor vehicle.

Known braking correction devices of the hydraulic type comprise a housing in which there is movable a stepped piston of which one end projects outwards from the housing, the piston having a head slidable in a bore in the housing so as to separate, within the housing, an inlet chamber adjoining the piston end face having the smaller effective cross-section from an outlet chamber adjoining the piston end face having the larger effective cross-section, the piston head containing a peripheral groove receiving with axial and radial clearance a ring of elastomeric material capable of disconnecting the two chambers when the piston moves a predetermined distance from its idle position which is fixed relative to the housing, overcoming a return force.

In correction devices of this type the two chambers are disconnected when the peripheral portion of the elastomeric ring moves in front of an orifice or slot in the wall of the housing. This results in premature wear on the operative part of the ring and a risk of leakage at this point, which would render the correction device completely unserviceable.

To overcome this disadvantage, the invention proposes a braking correction device of the type described, characterised in that the bore comprises a first portion having a fluid-tight side wall adjoining the inlet chamber and a second portion contiguous to the first portion and adjoining the outlet chamber, the second portion having a side wall which is permeable to hydraulic brake fluid.

In one embodiment of the invention the permeable wall is in the form of a sleeve of porous sintered material.

The invention will now be described with reference to the single FIGURE, which illustrates a braking correction device in section.

In this FIGURE, the correction device 10 is placed between a hydraulic brake pressure source of any known type, such as a master cylinder 12, and a brake actuator set 14 in a motor vehicle. The correction device 10 has a housing 16 containing a cylindrical cavity 18. The cavity 18 is divided into an inlet chamber 19 and outlet chamber 21 by a piston 20, of which the head 22 is slidable in a bore 24. The bore 24 has a first portion 26 adjoining the inlet chamber 19 and formed by a ring 28 mounted in a fluid-tight manner in the cylindrical cavity 18. A second portion 30 of the bore 24 is contiguous with the first portion and adjoins the outlet chamber 21. A feature of this second portion 30 is that it has a permeable side wall whereas the first portion has a fluid-tight side wall. In the embodiment of the invention described, by way of example only, the second portion 30 is formed by a sleeve 31 of porous sintered material. The material used is of the type encountered in sintered filter elements and may be of sintered corrosion-resistant steel, bronze or nickel, the porosity being of the order of 40% by volume. To allow the fluid which has passed through the sleeve 31 to flow freely to the outlet chamber 21, there are means for passing it along the outer periphery of the sleeve. In this embodiment the sleeve 31 is held radially by fins 32, so as to define an annular space 34 connected by apertures 36 to the outlet chamber 21.

The piston 20 is of the stepped type. Its end 38 remote from its head 22 projects outwards from the housing through a ring seal 40 and a support 42, both mounted in the cavity 18 and held in position by a circlip 44. The sleeve 31 and ring 28 are held in place in the end of the cavity 18 by a weak spring 46 supported against a retainer 48 adjoining the ring seal 40. The piston head 22 contains on its periphery a groove 50 which receives a ring 52 of elastomeric material with radial and axial clearance, as the FIGURE shows. The ring 52 acts as a valve closure member. To allow fluid to flow freely from the chamber 19 to the right-hand side of the ring and the bottom of the groove 50, the diameter of the piston head is reduced where it adjoins the inlet chamber 19, and also passages 54 are provided, as illustrated. The stepped piston 20 therefore has an end face of smaller effective cross-section adjoining the inlet chamber 19, which is connected to the master cylinder 12 by an inlet orifice 56, and an end face of larger effective cross-section adjoining the outlet chamber 21, which is connected to the brake actuators 14 by an outlet orifice 58. To conclude the description of the correction device embodying the invention, the piston 22 is biased into an idle position by a return force indicated diagrammatically by an arrow F. In this idle position, which is fixed relative to the housing, the piston bears on the end of the cavity 18. In the embodiment illustrated the force F is transmitted by a lever 60 pivotable on a pin 62 fixed to the housing 16, the free end of the lever 60 being associated with resilient return means (not shown) capable of generating the force F. Without exceeding the scope of the invention the tension of the resilient return means may be varied as a function of the load on at least one axle of the vehicle, by means of any construction known to those skilled in the art. Note that the braking correction device is not illustrated in its idle position, but in the limit position in which the two chambers 19, 21 are disconnected.

The braking correction device just described operates as follows.

When the brake circuit is idle, the piston is in the left-hand limit position in the FIGURE, so that the contact surface between the ring 52 and bore 24 is well to the left of the junction between the ring 28 and the sintered sleeve 31. When the brake circuit of the vehicle is operated, therefore, fluid from the inlet chamber 19 flows through the uncovered part of the sleeve 31 to the annular space 34 and so to the outlet chamber 21. During this first braking phase the pressures in the chambers 19, 21 are substantially equal. When the pressure in the chamber 19 reaches a predetermined value, depending on the effective cross-section of the end 38 and on the return force F, the piston 20 is moved towards the right in the FIGURE, so that on the one hand the left-hand side of the ring 52 cooperates in a fluid-tight manner with that surface of the groove 50 adjoining it (the position illustrated) and on the other the ring 52 conceals the end of the sintered sleeve and thereby cooperates a little, but in a fluid-tight manner owing to the effect of the pressure on the inside surface of the ring 52, with the fluid-tight surface 26 of the ring 28. Beyond this transition pressure any increase in pressure in the chamber 19 will cause the piston 20 to oscillate about the position shown, allowing the pressure in the chamber 21 to rise at a reduced rate compared to the pressure rise in the chamber 19. The reduction rate depends on the ratio between the effective cross-sections of the piston end faces adjoining the chambers 19, 21. Owing to the good surface condition of articles made from sintered material and also to the absence of orifices of small cross-section and of any other rough or abrupt point such as exists in the prior art, the wear on the periphery of the ring 52 is much reduced, so that the device lasts substantially longer. Moreover, the fact that the head 22 of the piston 20 slides on the sintered sleeve ensures good lubrication.

When the brakes of the vehicle are released, the piston 20 moves to the right in the FIGURE, sliding along the ring 28 until the pressures in the two chambers balance. The ring 52 then ceases to cooperate in a fluid-tight manner with the left-hand surface of the groove 50, and fluid can again flow freely from the chamber 21 to the chamber 19 through the sleeve and the passages 54.

What I claim is:

1. In a braking correction device having a housing which movably supports and encloses a stepped piston in a bore, the piston having a head which cooperates with the housing bore to substantially define an inlet chamber and an outlet chamber and the piston head carrying an elastomeric member which opens communication between the inlet chamber and the outlet chamber when the piston is in an idle position and closes communication between the inlet chamber and the outlet chamber when the piston is moved from its idle position, the improvement wherein said piston head is slidably disposed within a sleeve and a ring adjacent thereto, said sleeve being porous and disposed within the housing bore to adjoin the outlet chamber, said ring being disposed within the housing bore in fluid tight relation therewith and adjoining the inlet chamber, said sleeve and said ring being formed as elements separate from each other and said bore the elastomeric member cooperating with the porous sleeve to communicate the inlet chamber with the outlet chamber via the porous sleeve in the idle position and engaging the ring to close communication between the inlet chamber and the outlet chamber when the elastomeric member is moved with the head away from the idle position.

2. The braking correction device of claim 1 in which said ring and said porous sleeve are resiliently disposed to one end of the housing bore.

* * * * *